Jan. 15, 1963 J. P. BUNT 3,074,052
MAGNETIC CORE DELAY CIRCUIT FOR USE IN DIGITAL COMPUTERS
Filed April 8, 1957 2 Sheets-Sheet 1

Inventor
JOHN P. BUNT
By
Wenderoth, Lind & Ponack Attorneys

JOHN P. BUNT Inventor

By Wenderoth, Lind & Ponack Attorneys

United States Patent Office 3,074,052

Patented Jan. 15, 1963

3,074,052

MAGNETIC CORE DELAY CIRCUIT FOR USE IN DIGITAL COMPUTERS

John Percival Bunt, London, England, assignor to Elliott Brothers (London) Limited, London, England, a British company Filed Apr. 8, 1957, Ser. No. 651,359
Claims priority, application Great Britain Apr. 10, 1956
5 Claims. (Cl. 340—174)

This invention relates to magnetic core delay circuits for use in digital computers.

It is known to use several different types of such circuits in the construction of the various units of digital computing machines and a basic unit is a digit delay circuit which can be extended to perform the logical functions required in a digital computer.

A number of such digital delay circuits may be connected in sequence to form a delay line or shifting register and it is known to transfer information stored in one core of the sequence to the next core by applying a read out pulse simultaneously to all cores. However, since it is not possible to write information into a core at the same time as information is being read out of it, it is customary to provide between each core means for storing temporarily the information read out of one core before it is written into the next core. Such means which may consist of a further core increase the number of components required and the complexity of the circuit.

It is a principal object of the present invention to provide an improved means for providing temporary storage in a magnetic core digital delay circuit.

A further object of the present invention is to provide in a magnetic core digital delay circuit storage means which do not require the provision of additional components.

A still further object of this invention is to provide a magnetic core circuit capable of providing a plurality of outputs each of which provide temporary storage for the information read out.

Other objects and advantages of the improved magnetic core digital delay circuit of this invention will become apparent during the course of the following description of the invention with reference to the accompanying drawings, in which.

Figure 3:
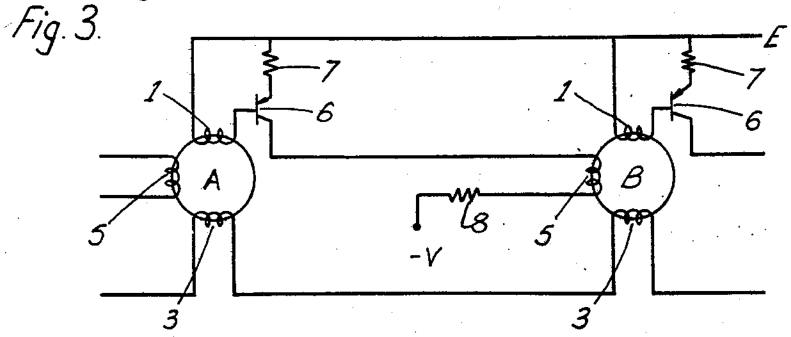
Figure 4:
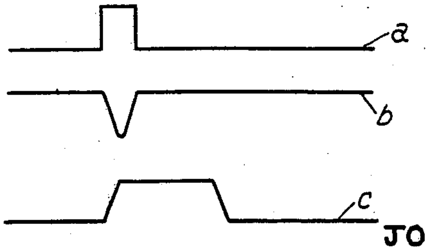
Figure 5:
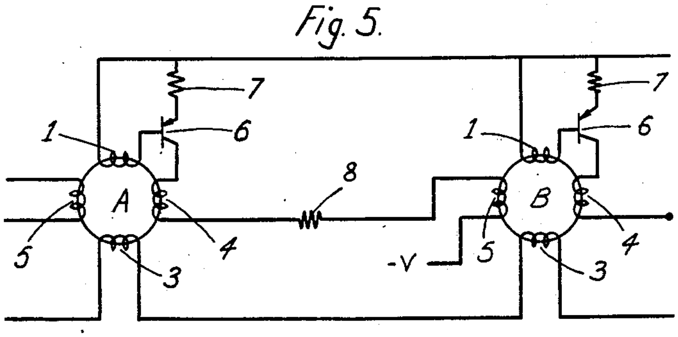
Figure 6:
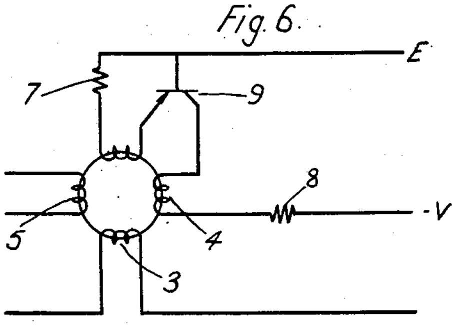
Figure 7:
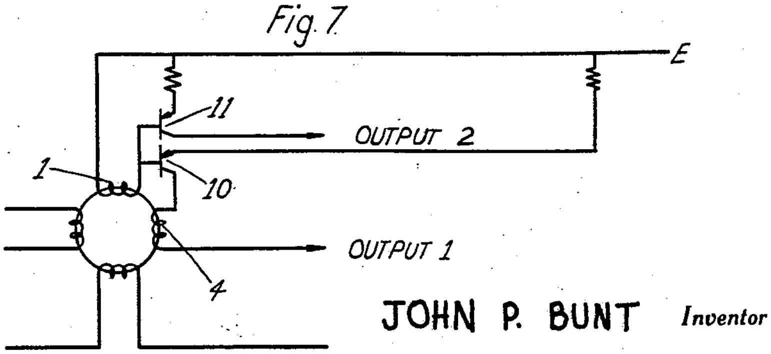

FIGURE 3 shows one form of a magnetic core digital delay circuit in accordance with this invention, FIGURE 4 is a representation of the waveform of currents flowing in parts of the circuit of FIGURE 3, FIGURE 5 shows a further form of magnetic core digital delay circuit in accordance with the invention, FIGURE 6 shows a modification of part of the circuit of FIGURE 5, and FIGURE 7 shows a further modification which provides multiple outputs.

Figure 1:
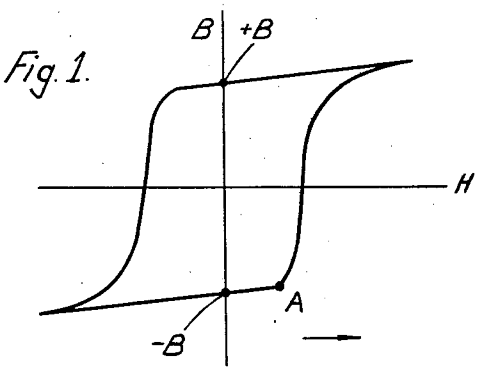
FIGURE 1 represents a hysteresis curve for a magnetic core.

The magnetic cores used in these digital delay circuits have a hysteresis loop of the kind shown in FIGURE 1. Such loop approximates to a rectangle and a single core may, therefore, be used to store indefinitely a binary digit in either of the two remanent states of magnetisation +B and −B which may correspond to the storage of the binary digits 0 and 1 respectively.

Figure 2:
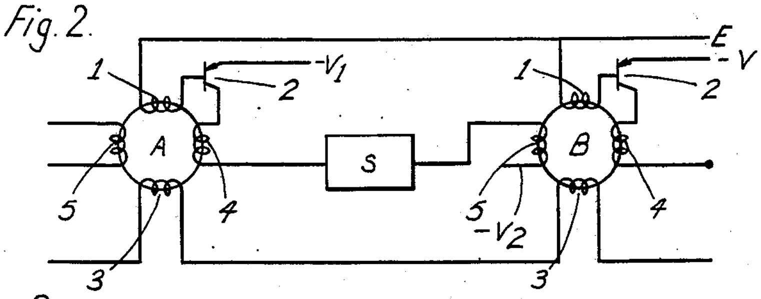
FIGURE 2 shows a known form of magnetic core delay circuit.

FIGURE 2 shows part of a known form of delay line or shifting register which uses a number of magnetic core digit delay circuits connected in sequence, only two cores A and B being shown. Ignoring for the moment the winding 1 on each core and the transister 2, each core is provided with a winding 3 by which a read out pulse may be applied to all cores simultaneously, an output winding 4, and an input winding 5.

If in such an arrangement a read out pulse is applied to the winding 3 in such a manner as to produce in the core A a field in the direction of the arrow (FIGURE 1), if the core is in the +B condition storing the digit 0, the net change in flux density in the core is very small and hence only a small voltage will appear across the output winding 4. If, however, the core was in the −B condition storing the digit 1, there is a large change in flux density and a large voltage is produced across the output winding 4. This voltage pulse may then be used to reverse the magnetisation of the next core B by applying it suitably to the input winding 5 of this core.

Supposing in the case of a sequence of such circuits that at a given time certain cores are magnetised so that they store the digit 1 whilst the others store the digit 0. In order to shift this information pattern along the line of cores, a read out pulse is applied to the winding 3 of each core simultaneously. This reads the information out of the cores and leaves each core in the same state of magnetisation storing the digit 0. At some later time the information read out is written back into the next core in the line through the input winding 5, reversing its magnetisation if it is required to store the digit 1. In this way the information may be made to progress along the line in one direction by means of repeated applications of the read out pulse.

Since in formation cannot be written into a core and read out of the same core simultaneously, the information read out through the winding 4 requires temporary storage before it can be written into the next core through the input winding 5 and in the known arrangement shown in FIGURE 2 such delay or storage is provided by the device S which is connected between the winding 4 of core A and the winding 5 of core B and may consist of a further suitably arranged core.

A necessary feature of all such systems is that there should be power gain available. That is to say, the power available from the information read out of a core should be greater than the power required to write the information into the succeeding core. This ensures that the information does not decay as it progresses along the line.

A further necessity is the provision of a threshold in the system to prevent small unwanted signals from growing into pulses indistinguishable from information pulses.

The power gain and threshold requirements have been met by various methods of associating a transistor with each core. In the example shown in FIGURE 2 the base and collector of the transistor 2 are connected with the windings 1 and 4 in such a way as to provide positive feedback from one winding to the other. If the core is in either of its saturated states +B or −B it can be arranged that the feedback ratio is less than unity, but if the core can be driven on to the slope of the B—H loop, that is to say from the −B state towards the point A, the ratio can be made greater than unity and the transistor 2 completes the change of state. Thus in such a circuit the read out or trigger pulse need only be of such amplitude and duration as to drive the core from its remanent state on to the slope of the B—H loops. The power gain is provided by the transistor which derives the necessary power from its D.C. power supply.

This power gain is, however, not essential to the operation of the arrangement if a read out pulse can be provided which is of sufficient amplitude to reverse the magnetisation of the core.

In the improved arrangement of this invention, a transistor, which may be used if required to provide the power gain and threshold is employed to provide the necessary temporary storage of the information read out of one core before it is written into the next core.

One form of magnetic core digital delay circuit in accordance with this invention is shown in FIGURE 3. As in FIGURE 2, two cores A and B of a sequence are shown and like parts are given the same reference numerals. In this arrangement, however, a transistor 6 is provided having its base connected in series with the winding 1 to the earth line E, its emitter connected through a resistor 7 with the earth line, and its collector connected in series with the winding 5 on core B and a resistor 8 with the negative terminal of a source of potential. The transistor 6 in this circuit operates as a store for information read out of the core but does not provide regeneration or amplification of such information. In such case it is necessary that the read out trigger pulse applied to the windings 3 of all the cores shall have an amplitude sufficient to reverse the magnetic condition of the core. Moreover the windings on the core, the operating potentials of the transistor and the value of the resistors 7 and 8 are so selected that when the trigger pulse is applied the transistor is driven to saturation. Under such conditions it will be found that the current in the collector circuit which includes the winding 5 of core B persists after the end of the trigger pulse whereby information stored in the core A may be written into the core B after the read out operation has ceased.

FIGURE 4 shows the waveform of the currents in the circuit, curve *a* representing the current pulse in the winding 3, curve *b* representing the current flowing in the transistor base circuit through winding 1 of core A, and curve *c* representing the current flowing in the collector circuit and through the winding 5 of core B.

In practice, the duration of the pulse shown at *a* may be of the order of 0.5 $\mu$secs. while the duration of the resultant current pulse shown at *c* may be of the order of 2 $\mu$secs.

In a typical example of an arrangement according to FIGURE 3 which is capable of providing such a storage time, the magnetic cores were either Mullard type FX1508 or General Ceramics type F394; the transistors type OC72 or GET4; the number of turns on the base winding 1 and the input winding 5 were 15 to 20 and 40 to 50 respectively the resistors 7 and 8 were 10 to 20 ohms and 500 to 600 ohms respectively, and the supply voltage was 20 volts.

In the operation of the circuit, and assuming that the core A is in the −B condition storing the digit 1 and that core B is in the +B condition storing the digit 0, the application of a read-out pulse to the trigger winding 3 of each core will reverse the magnetic condition of core A but will have no effect on the magnetic condition of core B. Simultaneously with the change of magnetic condition of core A, current will commence to flow in the collector circuit of the transistor associated with core A and through the input winding 5 of core B in such direction as to tend to drive core B into the −B condition although this change will be opposed while current flows in the trigger winding 3. However, since the collector current continues to flow as shown by FIG. 4 after the trigger pulse ceases, the magnetic condition of core B will change to the −B condition once the trigger pulse ceases. In this manner the transistor operates to provide a temporary storage for information read-out of core A and then to write this information directly into core B. Accordingly a single digit 1 may be made to progress along a line of cores by the continuous application of trigger pulses to all of the cores. In the case when the line is required to store a series of digits, whether 0 or 1, the arrangement will be operated in known manner with the information stored in alternate cores, intermediate cores being always in the +B condition storing the digit 0. In other words, the circuit of this invention will always be operated in such a manner that at any instant when one core is in the −B condition storing the digit 1 the next preceding and the next succeeding core will be in the +B condition storing the digit 0.

FIGURE 5 shows an alternative arrangement which is similar to that of FIGURE 3 but in which transistors are used to provide storage and also a power gain. In this case and in order to provide the required regeneration, the collector of the transistor 6 of core A is not connected directly with the load resistance 8 and winding 5 of core B but through the winding 4 of core A.

Let us suppose that the core A is storing the digit 1 in which case the core B will be in the opposite condition storing the digit 0 and that the trigger pulse is applied to the winding 3 as in the previous arrangement. With the windings 1, 3 and 4 arranged suitably, the base of the transistor 6 may be driven negative, causing collector current to flow and this is arranged to increase the change in flux density in the core still further and thus to produce a larger negative voltage on the base. This regenerative process continues until the core has reached saturation. During this period the collector current reaches a value at which it is limited by the load resistor 8. This value of collector current is maintained by the transistor for a short period after the core has completely reversed its state of magnetisation, due to the carrier storage in the transistor. Thus during this period the information read out of the core is stored only in the transistor. The collector current also passes through the input winding 5 of core B, thus effecting the writing into that core of the information read out of core A after the trigger pulse ceases.

With the power gain provided by the transistor it is not necessary that the trigger pulse supplied to the winding 3 shall have a large amplitude since it is sufficient assuming, for example, that the core is in the −B condition, that the pulse shall drive the core to the point A on the hysteresis curve of FIGURE 1.

It is not essential that the transistor is connected with the core windings as shown in FIGURE 3 or FIGURE 5. FIGURE 6 shows an alternative arrangement in which the transistor 9 is connected with its base directly connected with the earth line E, and its emitter connected in series with the winding 1 and the load resistor 7 to the earth line; the collector being connected through the winding 4 and load resistor 8 as in FIGURE 5. This arrangement also provides the desired carrier storage as regeneration.

In a further modification of the circuit of this invention, the core is used to drive two or more transistors in parallel without affecting the length of carrier storage in each transistor. One example of this arrangement is shown in FIGURE 7 where the transistor 10 is arranged as in FIGURE 5 to provide output and regeneration while the transistor 11 is arranged as in FIGURE 3 to provide a second output. Additional transistors may be provided each connected as the transistor 11 whereby the information stored in the core may be transferred with the desired delay to each of a number of further cores during the read out process. It will be appreciated that if regeneration can be dispensed with the winding 4 may be omitted.

In all the arrangements of FIGURE 3 and FIGURES 5 to 7 the length of the carrier storage period is determined by the core and transistor characteristics, by the number of turns in the winding 1, and the values of the emitter and load resistors 7 and 8. These parameters may be varied according to the nature of the logical circuits in a digital computer to which the basic circuit illustrated may be extended.

It will be appreciated from the foregoing that the improved magnetic core digit delay circuits of this invention provide for information storage whereby a read out pulse may be applied to all the cores simultaneously, and that where transistors are provided to produce amplification or regeneration of the information stored the improved circuits provide the desired storage without the use of additional components.

What I claim is:

1. A magnetic core digit delay circuit comprising at least two cores of material having a substantially rectangular hysteresis curve connected in succession, each core having an input winding, an output winding, a feedback winding and a trigger winding, all said trigger windings being connected together for simultaneous application of a read out trigger pulse to all said cores, and a transistor having a base and an emitter connected with said output winding and a collector connected through said feedback winding and a load resistor with the input winding of the next core.

2. A magnetic core digit delay circuit comprising at least two cores of material having a substantially rectangular hysteresis curve connected in succession, each core having an input winding, an output winding, a feedback winding, and a trigger winding, all said trigger windings being connected together for simultaneous application of a read out trigger pulse to all said cores, and a transistor having a base connected in series with said output winding of one core with the positive terminal of a source, an emitter connected through a resistor with said positive terminal, and a collector connected in series with said feedback winding of said one core, a load resistor and the input winding of the next core with the negative terminal of said supply.

3. A magnetic core digit delay circuit comprising at least two cores of material having a substantially rectangular hysteresis curve connected in succession, each core having an input winding, an output winding, a feedback winding, and a trigger winding, all said trigger windings being connected together for simultaneous application of a read out trigger pulse to all said cores, and a transistor having a base connected with the positive terminal of a source, an emitter connected in series with the output winding of one core and a resistor with the said positive terminal, and a collector connected in series with the feedback winding of said one core, a load resistor and the input winding of the next core with the negative terminal of said supply.

4. A magnetic core digit delay circuit including a magnetic core of material having a substantially rectangular hysteresis curve and having at least an output winding, a feedback winding and a trigger winding, a first transistor having a base connected in series with said output winding with the positive terminal of a source, an emitter connected in series with a resistor with said terminal and a collector forming a first output terminal, and a second transistor having a base connected with the base of said first transistor, an emitter connected in series with a resistor with said positive terminal, and a collector connected in series with said feedback winding with a second output terminal, each said transistor operating to provide temporary storage for information read out of said core by the application of a read out pulse to said trigger winding.

5. A one core per bit shifting register comprising a series of magnetic cores coupled in cascade, each core being formed of a material having a substantially rectangular hysteresis curve and being provided with an input, an output and a trigger winding, means for storing information read out of one core of the series and for writing it directly into the next adjacent core of the series, said means including a transistor for each core and comprising a base, a collector and an emitter electrode, a transistor input circuit including said base electrode connected with the output winding of said one core, a transistor output circuit including said collector electrode connected in series with the input winding of said next adjacent core, a feedback winding on each core connected in series in said transistor output circuit, said emitter electrode being common to said input and said output circuit, and means for applying a read-out pulse simultaneously to the trigger windings of all said cores.

References Cited in the file of this patent

UNITED STATES PATENTS

| | | |
|---|---|---|
| 2,644,892 | Gehman | July 7, 1953 |
| 2,644,893 | Gehman | July 7, 1953 |
| 2,652,501 | Wilson | Sept. 15, 1953 |
| 2,747,110 | Jones | May 22, 1956 |
| 2,911,626 | Jones | Nov. 3, 1959 |